US010239986B2

(12) United States Patent
Choi et al.

(10) Patent No.: US 10,239,986 B2
(45) Date of Patent: Mar. 26, 2019

(54) HIGHLY ELASTIC POLYESTER MODIFIED URETHANE RESIN AND CLEAR COAT COMPOSITION CONTAINING SAME

(71) Applicant: KCC Corporation, Seoul (KR)

(72) Inventors: Yong Ho Choi, Gyeonggi-do (KR); Myong Gi Choi, Gyeonggi-do (KR); Bon Yi Lee, Gyeonggi-do (KR); Chan Hun Kim, Gyeonggi-do (KR); Jong Yun Park, Ulsan (KR); Jong Wook Yun, Busan (KR)

(73) Assignee: KCC CORPORATION, Seoul (KR)

( * ) Notice: Subject to any disclaimer, the term of this patent is extended or adjusted under 35 U.S.C. 154(b) by 0 days.

(21) Appl. No.: 15/539,248

(22) PCT Filed: Apr. 15, 2015

(86) PCT No.: PCT/KR2015/003764
§ 371 (c)(1),
(2) Date: Jun. 23, 2017

(87) PCT Pub. No.: WO2016/104875
PCT Pub. Date: Jun. 30, 2016

(65) Prior Publication Data
US 2018/0022858 A1 Jan. 25, 2018

(30) Foreign Application Priority Data
Dec. 24, 2014 (KR) .................. 10-2014-0188540

(51) Int. Cl.
| | |
|---|---|
| *C09D 175/06* | (2006.01) |
| *C09D 143/04* | (2006.01) |
| *C08G 18/42* | (2006.01) |
| *C08G 63/685* | (2006.01) |
| *C08G 18/73* | (2006.01) |
| *C08G 63/91* | (2006.01) |
| *C09D 133/00* | (2006.01) |
| *C09D 5/00* | (2006.01) |
| *C09D 5/44* | (2006.01) |
| *C09D 7/65* | (2018.01) |

(52) U.S. Cl.
CPC ....... *C08G 18/423* (2013.01); *C08G 18/4202* (2013.01); *C08G 18/4241* (2013.01); *C08G 18/4277* (2013.01); *C08G 18/73* (2013.01); *C08G 63/685* (2013.01); *C08G 63/916* (2013.01); *C09D 5/00* (2013.01); *C09D 5/4465* (2013.01); *C09D 7/65* (2018.01); *C09D 133/00* (2013.01); *C09D 175/06* (2013.01)

(58) Field of Classification Search
CPC .......................... C09D 175/06; C09D 143/04
See application file for complete search history.

(56) References Cited

U.S. PATENT DOCUMENTS

| | | | | |
|---|---|---|---|---|
| 4,533,704 | A * | 8/1985 | Alexander | C09D 175/06 428/423.1 |
| 4,954,559 | A | 9/1990 | Den Hartog et al. | |
| 5,225,248 | A * | 7/1993 | Stephenson | B05D 1/36 427/333 |
| 2010/0004386 | A1 | 1/2010 | Nishino | |
| 2013/0089731 | A1 | 4/2013 | Imanaka et al. | |

FOREIGN PATENT DOCUMENTS

| | | |
|---|---|---|
| EP | 0152413 B1 | 11/1989 |
| JP | H03174479 A | 7/1991 |
| JP | H06212119 A | 8/1994 |
| JP | H0860094 A | 3/1996 |
| JP | 2006111857 A | 4/2006 |
| JP | 2013535311 A | 9/2013 |
| KR | 20020001322 A | 1/2002 |
| KR | 20030057784 A | 7/2003 |
| KR | 20100665882 B | 1/2007 |
| KR | 20090027043 A | 3/2009 |
| KR | 20120045074 A | 5/2012 |

OTHER PUBLICATIONS

English Abstract of KR 20030057784 A.*
Machine-generated English translation of KR 2003-0057784 A to Yoon et al. (Year: 2003).*
EP15873403.8 European Search Report dated Nov. 7, 2017.
JP2017534558 Office Action dated Apr. 27, 2018, 9 pgs.

* cited by examiner

*Primary Examiner* — Vu A Nguyen
(74) *Attorney, Agent, or Firm* — Bracewell LLP; Brad Y. Chin

(57) ABSTRACT

Embodiments relate to a highly elastic polyester modified urethane resin and a clear coat composition containing the same, and more particularly, to a highly elastic polyester modified urethane resin having improved chipping resistance by introducing an aliphatic isocyanate and a caprolactone polyol to a polyester resin, and a clear coat composition including the polyester modified urethane resin as a main resin. For example, there is provided a polyester modified urethane resin, including polyester derived units obtained from an aliphatic polyalcohol and an aliphatic or alicyclic polyacid, caprolactone polyol derived units; and aliphatic diisocyanate derived units, as resin constituting units.

11 Claims, No Drawings

HIGHLY ELASTIC POLYESTER MODIFIED URETHANE RESIN AND CLEAR COAT COMPOSITION CONTAINING SAME

CROSS REFERENCE TO RELATED APPLICATIONS

This application claims the benefit of and priority to PCT/KR2015/003764, filed on Apr. 15, 2015, entitled (translation), "HIGHLY ELASTIC POLYESTER MODIFIED URETHANE RESIN AND CLEAR COAT COMPOSITION CONTAINING SAME," which claims the benefit of and priority to Korean Patent Application No. 10-2014-0188540, filed on Dec. 24, 2014, all of which are hereby incorporated by reference in their entirety into this application.

BACKGROUND

Field:

Embodiments relate to a highly elastic polyester modified urethane resin and a clear coat composition containing same, and more particularly, to a highly elastic polyester modified urethane resin having improved chipping resistance by introducing an aliphatic isocyanate and a caprolactone polyol to a polyester resin, and a clear coat composition including the polyester modified urethane resin as a main resin, thereby omitting a separate forming process of a middle coating film, and securing good appearance and excellent mechanical properties such as scratch resistance, chipping resistance to cold, and impact resistance when compared to a conventional coating method.

Description of the Related Art:

In the conventional car coating system, a paint composition which imparts a middle coating film with elasticity, or a two liquid type paint composition using a clear coat with an isocyanate curing agent, was used to accomplish chipping resistance to cold and elasticity such as impact resistance of a final coating film.

In this regard, a primer composition for a car paint composition using an epoxy modified polyester resin and a block isocyanate curing agent (for example, EP Registration Patent No. 0152413), and a water-soluble paint composition for a middle coating film of a car using a polyurethane dispersion resin and a methylated melamine curing agent (for example, Korean Registration Patent No. 0665882) were disclosed. However, there are defects such that a separate process for forming a middle coating film is required, and process efficiency is reduced.

Accordingly, development on a main resin and a clear coat composition which may secure good appearance of a coating film and excellent mechanical properties such as scratch resistance, chipping resistance to cold and impact resistance without forming a separate middle coating film, is required.

SUMMARY

Embodiments of the invention have been devised in consideration of the above-mentioned problems of the conventional technique, and the object of the various embodiments is to provide a highly elastic polyester modified urethane resin having improved chipping resistance by introducing an aliphatic isocyanate and a caprolactone polyol to a polyester resin, and a clear coat composition including the polyester modified urethane resin as a main resin, thereby omitting a separate forming process of a middle curing film and securing good appearance and excellent mechanical properties such as scratch resistance, chipping resistance to cold, and impact resistance when compared to a conventional coating method.

Embodiments provide a polyester modified urethane resin including (1) polyester derived units obtained from an aliphatic polyalcohol and an aliphatic or alicyclic polyacid, (2) caprolactone polyol derived units, and (3) aliphatic diisocyanate derived units, as resin constituting units.

According to at least one embodiment, the aliphatic polyalcohol is at least one kind of aliphatic compound having 3 to 12 carbon atoms and at least two hydroxyl groups.

According to at least one embodiment, the aliphatic polyalcohol is selected from propanediol, butanediol, neopentyl glycol, trimethylol propane and a combination thereof.

According to at least one embodiment, the aliphatic or alicyclic polyacid is selected from hexane dicarboxylic acid, cyclohexyl dicarboxylic acid, and a combination thereof.

According to at least one embodiment, the aliphatic diisocyanate is at least one aliphatic or alicyclic hydrocarbon compound having 4 to 20 carbon atoms and at least two isocyanate groups.

According to least one embodiment, the aliphatic diisocyanate is selected from hexamethylene diisocyanate, isophorone diisocyanate, dicyclohexylmethane diisocyanate, and a combination thereof.

According to at least one embodiment, the polyester modified urethane resin has a hydroxyl value of 30-200 mgKOH, and an acid value of 1-50 mgKOH/g.

According to another embodiment, there is provided a method of preparing a polyester modified urethane resin including (a) reacting an aliphatic polyalcohol with an aliphatic or alicyclic polyacid to synthesize a polyester intermediate; and (b) reacting the polyester intermediate thus synthesized, a caprolactone polyol, and an aliphatic diisocyante to synthesize a polyester modified urethane resin.

According to another embodiment, there is provided a clear coat composition including 5-30 parts by weight of the polyester modified urethane resin according to any one of claims 1 to 8; 20-60 parts by weight of a silane modified acryl polyol resin; 5-30 parts by weight of a curing agent; 0.5-3 parts by weight of a curing catalyst; and 10-25 parts by weight of a solvent, based on 100 parts by weight of a total amount of the composition.

According to at least one embodiment, the silane modified acryl polyol resin has a weight average molecular weight (Mw) of 5,000-10,000, a hydroxyl value of 20-120 mgKOH/g, and a glass transition temperature of 10-80° C.

According to another embodiment, there is provided a molded article including at least one coating film formed from the clear coat composition.

DETAILED DESCRIPTION

Hereinafter, embodiments of the invention will be described in more detail.

According to at least one embodiment, the polyester modified urethane resin includes (1) polyester derived units obtained from an aliphatic polyalcohol and an aliphatic or alicyclic polyacid, (2) caprolactone polyol derived units, and (3) aliphatic diisocyanate derived units, as resin constituting units.

According to at least one embodiment, the aliphatic polyalcohol may use an aliphatic compound having 3 to 12 carbon atoms (more particularly, 4 to 10 carbon atoms) and at least two (for example, 2-4) hydroxyl groups (—OH) alone, or as a mixture of two or more thereof. For example, the aliphatic polyalcohol may be selected from propanediol, butanediol, neopentyl glycol, trimethylol propane, and a combination thereof, without limitation.

The aliphatic or alicyclic polyacid may use an aliphatic polyacid having 3 to 12 carbon atoms (more particularly 4 to 10 carbon atoms), or an alicyclic polyacid having 5 to 12 carbon atoms (more particularly 6 to 10 carbon atoms) and having at least two (for example, 2-4) carboxylic acids (—COOH) alone, or as a mixture of two or more thereof. For example, the aliphatic or alicyclic polyacid may be selected from hexane dicarboxylic acid, cyclohexyl dicarboxylic acid, and a combination thereof, without limitation.

According to at least one embodiment, the caprolactone polyol is a linear polyester diol derived from caprolactone. The caprolactone polyol may have a weight average molecular weight (Mw) of 500-1,500, without specific limitation. If the weight average molecular weight is greater than 1,500, workability and hardness of a coating film may be deteriorated due to high viscosity, and if the weight average molecular weight is less than 500, mechanical and chemical properties may be deteriorated.

The aliphatic diisocyanate may use an aliphatic or alicyclic hydrocarbon compound having 4 to 20 carbon atoms (more particularly, 4 to 16 carbon atoms) and two isocyanate groups (—N=C=O), alone or as a mixture of two or more thereof, and for example, may be selected from hexamethylene diisocyanate, isophorone diisocyanate, dicyclohexylmethane diisocyanate, and a combination thereof, without limitation.

The polyester modified urethane resin according to at least one embodiment may be prepared by a method including (a) reacting an aliphatic polyalcohol with an aliphatic or alicyclic polyacid to synthesize a polyester intermediate; and (b) reacting the polyester intermediate thus synthesized, a caprolactone polyol and an aliphatic diisocyante to synthesize a polyester modified urethane resin.

According to at least one embodiment, if one of the aliphatic polyacid or the alicyclic polyacid is used in step (a), the amount of each component may be 40-60 wt % of the aliphatic polyalcohol and 40-60 wt % of the aliphatic (or alicyclic) polyacid based on 100 wt % of the total amount of reactants used in step (a), without limitation. In addition, if both the aliphatic polyacid and the alicyclic polyacid are used in step (a), the amount of each component may be 30-60 wt % of the aliphatic polyalcohol, 5-40 wt % of the aliphatic polyacid, and 30-60 wt % of the alicyclic polyacid based on 100 wt % of the total amount of reactants used in step (a), without limitation.

In addition, according to at least one embodiment, the amount of each component used in step (b) may be 40-70 wt % of the polyester intermediate, 20-40 wt % of the caprolactone polyol, and 5-40 wt % of the aliphatic diisocyanate based on 100 wt % of the total amount of reactants used in step (b), without limitation.

According to at least one embodiment, the polyester modified urethane resin may be used as a main resin of the clear coat composition, which will be described below. The aliphatic isocyanate applied in the main resin introduces a urethane group into a main chain, and the caprolactone polyol introduces a flexible elastic group in the main chain, and if the highly elastic polyester modified urethane resin thus prepared is used as the main resin of a clear coat composition, chipping resistance may be improved.

According to at least one embodiment, the polyester modified urethane resin may have a solid content of 50-70%, a hydroxyl value of 30-200 mgKOH/g (more particularly, 50-100 mgKOH/g), and an acid value of 1-50 mgKOH/g (more particularly, 2-20 mgKOH/g). In the case where the hydroxyl value is less than 30 mgKOH/g, loss modulus may increase, and a coating film may be soften, and in the case where the hydroxyl value is greater than 200 mgKOH/g, hardness of a coating film may be reinforced, but elasticity may decrease, thereby generating the defect of deteriorating chipping resistance. In addition, if the acid value is deviated from the above range, the overall mechanical and chemical properties of a coating film may be deteriorated due to the decrease of a molecular weight. In addition, the weight average molecular weight (Mw) of the polyester modified urethane resin may be 500-5,000, without specific limitation, to exhibit optimized chipping resistance and other physical properties.

According to at least one embodiment, there is provided a clear coat composition including 5-30 parts by weight of the polyester modified urethane resin; 20-60 parts by weight of a silane modified acryl polyol resin; 5-30 parts by weight of a curing agent; 0.5-3 parts by weight of a curing catalyst; and 10-25 parts by weight of a solvent, based on 100 parts by weight of the total amount of the composition.

In the clear coat composition according to at least one embodiment, the polyester modified urethane resin may be included in an amount of 5-30 parts by weight, preferably, 10-28 parts by weight, and more preferably, 15-25 parts by weight. If the amount is less than 5 parts by weight, small quantity of elasticity and flexibility may be imparted to a finally obtained coating film, and physical properties such as scratch resistance, impact resistance and chipping resistance may be deteriorated, and if the amount is greater than 30 parts by weight, water resistance and hardness of the finally obtained coating film may be deteriorated.

According to at least one embodiment, the silane modified acryl polyalcohol resin may be included in an amount of 20-60 parts by weight, preferably, 30-55 parts by weight, and more preferably, 40-50 parts by weight. If the amount is less than 20 parts by weight, the physical properties of the finally obtained coating film such as hardness, water resistance, and weather resistance may become a problem, and if the amount is greater than 60 parts by weight, physical properties such as impact resistance and chipping resistance may be deteriorated.

In addition, the silane modified acryl polyol resin may be included in an amount of 20-60 parts by weight, preferably, 30-55 parts by weight, and more preferably, 40-50 parts by weight. If the amount is less than 20 parts by weight, the physical properties of a finally obtained coating film such as hardness, water resistance and weather resistance may become problem, and if the amount is greater than 60 parts by weight, physical properties such as impact resistance and chipping resistance may be deteriorated.

In addition, the silane modified acryl polyol resin may have a solid content of 50-80% based on the total amount of the resin, a weight average molecular weight (Mw) of 5,000-10,000, a hydroxyl value of 20-120 mgKOH/g, more particularly, 50-100 mgKOH/g. In addition, the glass transition temperature may be 10-80° C., and more particularly, 10-70° C. The weight average molecular weight (Mw) is closely related with workability and mechanical and chemical properties, and if deviated from the above range, workability and mechanical and chemical properties may be deteriorated. The hydroxyl value may have closely related with the crosslinking density of a paint coating film. This value affects weather resistance and hardness, and if deviated from the range, weather resistance and hardness may be deteriorated.

According to at least one embodiment, the curing agent may be included in an amount of 5-30 parts by weight, preferably, 10-25 parts by weight, and more preferably, 15-20 parts by weight. If the amount is less than 5 parts by weight, a coating film may become soften, and hardness and water resistance may be deteriorated. If the amount is greater than 30 parts by weight, a coating film may become hard, and impact resistance and chipping resistance may be deteriorated.

According to at least one embodiment, the curing agent may be selected from hexamethylol melamine, hexamethoxymethyl melamine, hexabutoxymethyl melamine, hexamethoxybutoxymethyl melamine, iminomethoxymethyl melamine and a combination thereof, without specific limitation.

According to at least one embodiment, the curing catalyst may be included in an amount of 0.5-3 parts by weight, preferably 1-2.5 parts by weight, and more preferably, 1.3-2 parts by weight. If the amount is less than 0.5 parts by weight, curing rate may decrease, and crosslinking density may decrease, thereby deteriorating hardness, water resistance, solvent resistance, etc. If the amount is greater than 3 parts by weight, curing rate may increase, and a coating film may become hard, thereby generating defects of deteriorating impact resistance, chipping resistance, and re-coating attachment.

According to at least one embodiment, the curing catalyst may be selected from dodecylbenzene sulfonic acid, sulfonic acid, dinonylnaphthalene disulfonic acid, dinonylnaphthalene sulfonic acid, paratoluene sulfonic acid, and a combination thereof.

According to at least one embodiment, the clear coat composition may further include one selected from the group consisting of a leveling agent, a light stabilizer, a storage improving agent, and a combination thereof as an additive.

According to another embodiment, a molded article including at least one coating film formed using the clear coat composition is provided. The molded article may be a metal or nonmetal material, for example, a part of a car.

Hereinafter, the present invention will be explained in more detail, referring to various embodiments and comparative embodiments. However, the scope of the present invention is not limited thereto.

EXAMPLES

1. Synthetic Example 1

Preparation of Polyester Modified Urethane Resin 1

To a four-necked flask for synthesis, equipped with a thermometer and a stirring equipment, 7 g of butanediol, 7 g of neopentyl glycol, 4 g of trimethylolpropane, 12 g of cyclohexyl dicarboxylic acid, and 7 g of hexane dicarboxylic acid were added in order, and the temperature was gradually elevated to 210° C. while supplying a nitrogen gas. After elevating the temperature, the reactants were stood until solid state materials were completely dissolved and maintained a transparent state. Then, when the temperature of the upper part of a column decreased, a xylene refluxing reaction was conducted and cooled at an acid value of 10 or less and the reaction product was diluted with 24 g of xylene. After preparing an intermediate polyester resin and at the temperature of 80° C. or less, 20 g of a caprolactone polyol, 5 g of hexamethylene diisocyanate, and 15 g of propylene glycol monomethyl ether acetate were added and reacted at 100° C. When the amount of isocyanate reached "0", the reaction was terminated. The acid value of the polyester modified urethane resin thus synthesized was 5 mgKOH/g, and the hydroxyl value thereof was 77 mgKOH/g.

2. Synthetic Example 2

Preparation of Polyester Modified Urethane Resin 2

To a four-necked flask for synthesis, equipped with a thermometer and a stirring equipment, 10 g of butanediol, 7 g of neopentyl glycol, 4 g of trimethylolpropane, 11 g of cyclohexyl dicarboxylic acid, and 6 g of hexane dicarboxylic acid were added in order, and the temperature was gradually elevated to 210° C. while supplying a nitrogen gas. After elevating the temperature, the reactants were stood until solid state materials were completely dissolved and maintained a transparent state. Then, when the temperature of the upper part of a column decreased, a xylene refluxing reaction was conducted and cooled at an acid value of 40 or less and the reaction product was diluted with 22 g of xylene. After preparing an intermediate polyester resin and at the temperature of 80° C. or less, 20 g of a caprolactone polyol, 3 g of hexamethylene diisocyanate, and 15 g of propylene glycol monomethyl ether acetate were added and reacted at 100° C. When the amount of isocyanate reached "0", the reaction was terminated. The acid value of the polyester modified urethane resin thus synthesized was 30 mgKOH/g, and the hydroxyl value thereof was 150 mgKOH/g.

3. Synthetic Example 3

Preparation of Polyester Modified Urethane Resin 3

To a four-necked flask for synthesis, equipped with a thermometer and a stirring equipment, 12 g of butanediol, 9 g of neopentyl glycol, 4 g of trimethylolpropane, 9 g of cyclohexyl dicarboxylic acid, and 4 g of hexane dicarboxylic acid were added in order, and the temperature was gradually elevated to 210° C. while supplying a nitrogen gas. After elevating the temperature, the reactants were stood until solid state materials were completely dissolved and maintained a transparent state. Then, when the temperature of the upper part of a column decreased, a xylene refluxing reaction was conducted and cooled at an acid value of 80 or less and the reaction product was diluted with 24 g of xylene. After preparing an intermediate polyester resin and at the temperature of 80° C. or less, 20 g of a caprolactone polyol, 3 g of hexamethylene diisocyanate, and 15 g of propylene glycol monomethyl ether acetate were added and reacted at 100° C. When the amount of isocyanate reached "0", the reaction was terminated. The acid value of the polyester modified urethane resin thus synthesized was 60 mgKOH/g, and the hydroxyl value thereof was 280 mgKOH/g.

4. Examples 1, 2, 3 and 4 and Comparative Examples 1, 2 and 3

Clear coat compositions for a car were prepared using the polyester modified urethane resins 1, 2 and 3 prepared in Synthetic Examples 1, 2 and 3, performing mixing in a ratio shown in the following Table 1, and adjusting a final viscosity to 35 seconds by Ford Cup #4. A first base coat (thickness of dried coating film: 12-16 microns), and a second base coat (thickness of dried coating film: 12-20 microns), which were separately prepared aqueous paint compositions for a car, were bell coated on aside for electrodeposition, and remaining water in the paint composition was evaporated by blowing hot air at 80° C. for 5 minutes. Each of the clear coat compositions of Examples 1, 2, 3 and 4 and Comparative Examples 1, 2 and 3 was coated thereon and cured in a common oven at 140° C. for 25 minutes to form a final coating film.

TABLE 1

(amount: parts by weight)

| Component | Example 1 | Example 2 | Example 3 | Example 4 | Comparative Example 1 | Comparative Example 2 | Comparative Example 3 |
|---|---|---|---|---|---|---|---|
| Polyester modified urethane resin 1 | 20 | 9 | 28 | — | — | 40 | — |
| Polyester modified urethane resin 2 | — | — | — | 20 | — | — | — |
| Polyester modified urethane resin 3 | — | — | — | — | — | — | 20 |
| Silane modified acryl polyol resin | 43 | 54 | 35 | 43 | 63 | 23 | 43 |
| Melamine curing agent | 16 | 16 | 16 | 16 | 16 | 16 | 16 |
| Catalyst | 1.5 | 1.5 | 1.5 | 1.5 | 1.5 | 1.5 | 1.5 |
| Leveling agent | 0.5 | 0.5 | 0.5 | 0.5 | 0.5 | 0.5 | 0.5 |
| Light stabilizer 1 | 1 | 1 | 1 | 1 | 1 | 1 | 1 |
| Light stabilizer 2 | 1 | 1 | 1 | 1 | 1 | 1 | 1 |
| Cocosol #100 | 11 | 11 | 11 | 11 | 11 | 11 | 11 |
| Butanol | 6 | 6 | 6 | 6 | 6 | 6 | 6 |
| Total | 100 | 100 | 100 | 100 | 100 | 100 | 100 |

Silane modified acryl polyol resin: a silane modified acryl polyol resin (KCC) having a solid content of 70%, a weight average molecular weight (Mw) of 8,000, a hydroxyl value of 75-95 mgKOH/g, and a glass transition temperature of 35-45° C.
Melamine curing agent: an alkylated melamine resin (cymel 1168, Cytec Co., Ltd.)
Catalyst: an acid catalyst of a dodecylbenzene sulfonic acid type (NACURE 5225, King Industries Co., Ltd.)
Leveling agent: a silicon leveling agent (BYK-331, BYK Co., Ltd.)
Light stabilizer 1: a benzotriazole-based stabilizer (Tinuvin 384, BASF Co., Ltd.)
Light stabilizer 2: a hindered amine light stabilizer (Tinuvin292, BASF Co., Ltd.)

The appearance and physical properties of a final coating film were measured by the following methods, and the results are listed in Table 2 below.

TABLE 2

| Physical properties of coating film | Example 1 | Example 2 | Example 3 | Example 4 | Comparative Example 1 | Comparative Example 2 | Comparative Example 3 |
|---|---|---|---|---|---|---|---|
| Appearance | ⊚ | ⊚ | ⊚ | ○ | ○ | ○ | ○ |
| Adhesiveness | ⊚ | ⊚ | ⊚ | ⊚ | ○ | ⊚ | ○ |
| Scratch resistance | ⊚ | ○ | ⊚ | ○ | Δ | ⊚ | ⊚ |
| Chipping resistance to cold | ⊚ | ○ | ⊚ | ○ | X | ⊚ | Δ |
| Hardness | ⊚ | ⊚ | ○ | ⊚ | ⊚ | X | ⊚ |
| Impact property | ⊚ | ○ | ⊚ | ○ | X | ⊚ | X |
| Water resistance | ⊚ | ⊚ | ○ | ⊚ | ⊚ | Δ | ⊚ |

Evaluation: ⊚-excellent, ○-good, Δ-common, X-bad
(1) Appearance: A CF value of a final coating film was measured (the higher, the better) by applying Wave Scan DOI (BYK Gardner) which is an appearance measuring apparatus of a car. The measured result was evaluated as ⊚-excellent (CF value of 65 or more), ○-good (CF value of 60-65), Δ-common (CF value of 55-60), and X-bad (CF value of less than 55).
(2) Adhesiveness: measured by forming 100 numbers of 2 mm crosscuts and detaching using a scotch tape. The result was evaluated as "good" when no defect was found, and as "excellent" when no detachment was found even at the crosscutting part of the blade of a knife.
(3) Scratch resistance: 20-degree gloss of the surface of a coating film was measured before and after a test by a method of measuring resistance against the generation of the scratch of a completed coating film using a measuring apparatus of scratch resistance (AMTEC-KISTER ™) for a car, and gloss retention rate (%) was calculated and evaluated (the higher, the better). The measured result was evaluated by the gloss retention ratio (%) as ⊚-excellent when 70% or more, ○-good when 60-65%, Δ-common when 55-60%, and X-bad when 55% or less.

TABLE 2-continued

| Physical properties of coating film | Example 1 | Example 2 | Example 3 | Example 4 | Comparative Example 1 | Comparative Example 2 | Comparative Example 3 |
| --- | --- | --- | --- | --- | --- | --- | --- |

(4) Chipping resistance to cold: A method of hitting the surface of a coating film by standing at −20° C. for 3 hours and then pushing 50 g of chipping stones using a pressure of 5 bar, was used. The measured result was evaluated as "excellent" when damages with a size of 1 mm or less were 10 or less, "good" when damages with a size of 1-2 mm were 10 or less, "common" when damages with a size of 2-3 mm were 10 or less, and "bad" when damages with a size of 2-3 mm were 10 or more.
(5) Hardness: measured by a pencil hardness method (hardness not damaging a coating film using each pencil of 3B, 2B, B, HB, F, H, 2H and 3H was measured). The measured result was evaluated as ⊚-excellent (HB or more), ○-good (B), and X-bad (2B or less).
(6) Impact property: No crack and exfoliation were required to be generated on a coating film when a pendulum of 500 g was dropped from a height of 30 cm or more. The measured result was evaluated as "excellent" when no crack was generated from a height of 50 cm or more, "good" when no crack was generated from a height of 40-50 cm, "common" when no crack was generated from a height of 30-40 cm, and "bad" when no crack was generated from a height of 30 cm or less.
(7) Water resistance: A completed coating film was immersed in a bath having a constant temperature of 40° C. for 10 days, and adhesiveness test and discoloration evaluation were conducted. The measured result was evaluated as "excellent" when adhesiveness was good and discoloration was not generated, and as "common" when adhesiveness was good but color was recovered after discoloration.

As known from the result in Table 2, the coating films of Examples 1 to 3 formed using the clear coat compositions of the present invention without applying a forming process of a separate middle coating film, had good appearance and mechanical properties. In particular, mechanical properties concerning scratch resistance, chipping resistance to cold, coating film elasticity such as impact property were good.

On the contrary, for Comparative Example 1 in which the polyester modified urethane resin of the present invention was not included, scratch resistance, chipping resistance to cold and impact property were assessed as common or bad, and for Comparative Example 2 in which an excessive amount of the polyester modified urethane resin was included, hardness and water resistance were assessed as common or bad. In addition, for Comparative Example 3, in which a polyester modified urethane resin having an acid value and a hydroxyl value different from those of the polyester modified urethane resin of the present invention, chipping resistance to cold and impact property were assessed as common or bad.

Embodiments provide non-obvious advantages over the conventional art. For example, a polyester modified urethane resin according to at least one embodiment introduces an aliphatic isocyanate and a caprolactone polyol to a polyester resin, and has high elasticity and improved chipping resistance, accordingly, a clear coat composition applying the same may have good appearance of a coating film and secure excellent mechanical properties such as scratch resistance, chipping resistance to cold and impact resistance, and a forming process of a middle coating film may be omitted.

The invention claimed is:
1. A clear coat composition, comprising:
   5-30 parts by weight of a polyester modified urethane resin, comprising
      polyester derived units obtained from an aliphatic polyalcohol and an aliphatic or alicyclic polyacid:
      caprolactone polyol derived units; and
      aliphatic diisocyanate derived units, as resin constituting units; and
   20-60 parts by weight of a silane modified acryl polyol resin,
   based on 100 parts by weight of a total amount of the composition,
   wherein the silane modified acryl polyol resin has a hydroxyl value of 20-120 mgKOH/g, and a glass transition temperature of 10-80° C.
2. The clear coat composition of claim 1, wherein the aliphatic polyalcohol is at least one kind of aliphatic compound having 3 to 12 carbon atoms and at least two hydroxyl groups.
3. The clear coat composition of claim 1, wherein the aliphatic polyalcohol is selected from propanediol, butanediol, neopentyl glycol, trimethylol propane and a combination thereof.
4. The clear coat composition of claim 1, wherein the aliphatic or alicyclic polyacid is at least one aliphatic polyacid having 3 to 12 carbon atoms and at least two carboxylic acid groups, at least one alicyclic polyacid having 5 to 12 carbon atoms and at least two carboxylic acid groups, or a mixture thereof.
5. The clear coat composition of claim 1, wherein the aliphatic or alicyclic polyacid is selected from hexane dicarboxylic acid, cyclohexyl dicarboxylic acid, and a combination thereof.
6. The clear coat composition of claim 1, wherein the aliphatic diisocyanate is at least one aliphatic or alicyclic hydrocarbon compound having 4 to 20 carbon atoms and at least two isocyanate groups.
7. The clear coat composition of claim 1, wherein the aliphatic diisocyanate is selected from hexamethylene diisocyanate, isophorone diisocyanate, dicyclohexylmethane diisocyanate, and a combination thereof.
8. The clear coat composition of claim 1, wherein the polyester modified urethane resin has a hydroxyl value of 30-200 mgKOH, and an acid value of 1-50 mgKOH/g.
9. The clear coat composition of claim 1, further comprising:
   5-30 parts by weight of a curing agent;
   0.5-3 parts by weight of a curing catalyst; and
   10-25 parts by weight of a solvent, based on 100 parts by weight of a total amount of the clear coat composition.
10. The clear coat composition of claim 1, wherein the silane modified acryl polyol resin has a weight average molecular weight (Mw) of 5,000-10,000.
11. A molded article comprising at least one coating film formed using the clear coat composition of claim 9.

* * * * *